(12) United States Patent
Allain et al.

(10) Patent No.: US 7,281,518 B1
(45) Date of Patent: Oct. 16, 2007

(54) METHOD AND SYSTEM OF DIESEL ENGINE SETPOINT COMPENSATION FOR TRANSIENT OPERATION OF A HEAVY DUTY DIESEL ENGINE

(75) Inventors: Marc Christian Allain, Plymouth, MI (US); Min Sun, Troy, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 11/724,509

(22) Filed: Mar. 15, 2007

(51) Int. Cl.
*F02M 1/00* (2006.01)
*B60T 7/12* (2006.01)

(52) U.S. Cl. ............ 123/434; 123/568.14; 123/480; 123/382; 701/103

(58) Field of Classification Search ........ 123/434, 123/435, 446, 478, 480, 305, 382, 463, 568.14, 123/568.2, 568.12; 701/103, 104, 105, 108
See application file for complete search history.

(56) References Cited

U.S. PATENT DOCUMENTS

| | | | |
|---|---|---|---|
| 6,062,201 A * | 5/2000 | Nozawa et al. ............ 123/478 |
| 6,311,484 B1 | 11/2001 | Roth et al. | |
| 6,347,519 B1 | 2/2002 | Kreso | |
| 6,422,219 B1 | 7/2002 | Savonen et al. | |
| 6,457,461 B1 | 10/2002 | Romzek | |
| 6,460,522 B1 | 10/2002 | Rimnac | |
| 6,502,563 B2 | 1/2003 | Itoyama | |
| 6,508,237 B2 | 1/2003 | Romzek et al. | |
| 6,508,242 B2 | 1/2003 | Jaliwala et al. | |
| 6,588,210 B2 | 7/2003 | Kreso | |
| 6,601,387 B2 | 8/2003 | Zurawski et al. | |
| 6,697,729 B2 | 2/2004 | Wright | |
| 6,701,710 B1 | 3/2004 | Ahrens et al. | |
| 6,708,104 B2 | 3/2004 | Avery, Jr. et al. | |
| 6,732,522 B2 | 5/2004 | Wright et al. | |
| 6,782,737 B2 | 8/2004 | Wright | |
| 6,837,217 B1 | 1/2005 | Hoshino et al. | |
| 6,866,030 B1 | 3/2005 | Sun et al. | |
| 6,882,929 B2 | 4/2005 | Liang et al. | |
| 6,947,830 B1 * | 9/2005 | Froloff et al. ............ 701/111 |
| 6,965,826 B2 | 11/2005 | Andres et al. | |
| 7,032,581 B2 * | 4/2006 | Gibson et al. ............ 123/673 |
| 7,063,076 B1 | 6/2006 | Sun | |
| 7,110,924 B2 | 9/2006 | Prewett et al. | |
| 2002/0185109 A1 | 12/2002 | Flynn et al. | |
| 2003/0177765 A1 | 9/2003 | Wang | |
| 2003/0200955 A1 | 10/2003 | zur Loye et al. | |
| 2004/0103860 A1 | 6/2004 | zur Loye et al. | |
| 2005/0205074 A1 * | 9/2005 | Gibson et al. ............ 123/673 |
| 2006/0011159 A1 | 1/2006 | Bloms et al. | |
| 2006/0130464 A1 | 6/2006 | Sun et al. | |
| 2006/0288701 A1 | 12/2006 | Ramamurthy et al. | |

OTHER PUBLICATIONS

Authors: Jonathan R. Hagena; Zoran S. Fillipi, and Dennis N. Assanis Title: Transient Diesel Emissions: Analysis of Engine Operation During a Tip-In #2006-01-1151 Copyright 2006 SAE International.

Authors: I. Kolmanovsky; A.G. Stefanopoulou; B.K. Powell; Ford Research Laboratory, Dearborn, Michigan; Dept. of Mechanical and Envrionmental Engineering, UC, Santa Barbara. Title: Improving Turbocharged Diesel Engine Operation with Turbo Power Assist System.

* cited by examiner

*Primary Examiner*—John T. Kwon
(74) *Attorney, Agent, or Firm*—Rader, Fishman & Grauer, PLLC

(57) ABSTRACT

Method for controlling and improving the transient emissions of an electronically controlled heavy duty diesel engine having an ECM with memory, a turbocharger and an EGR system.

20 Claims, 2 Drawing Sheets

METHOD AND SYSTEM OF DIESEL ENGINE SETPOINT COMPENSATION FOR TRANSIENT OPERATION OF A HEAVY DUTY DIESEL ENGINE

BACKGROUND OF THE INVENTION

1. Field of the Invention

The present invention is directed to a method and system of diesel engine setpoint compensation for transient operation of a heavy duty diesel engine.

2. Description of the Related Art

Sun et al, U.S. Pat. No. 6,866,030 is directed to a method for controlling a compression ignition internal combustion engine exhaust recirculation (EGR) system having an EGR valve and an actuator. The method includes continuously monitoring at least one engine parameter in real time, and continuously adjusting as EGR valve position using a control signal in real time in response to the at least one parameter and in response to at least one delay, wherein one of the at least one delays corresponds to as EGR actuator delay.

Sun, U.S. Pat. No. 7,063,076 is directed to a method of smoke limiting of an engine. The method may include determining a minimum air/fuel (AFR) ratio and fuel limiting as a function thereof. The method may further include determining a maximum fueling rate as a function of minimum AFR and sir mass flow to the engine. The method may include controlling the engine according to a requested fueling rate unless the requested fueling rate is greater than the maximum allowable fueling rate.

Diesel engines require almost constant modulation of setpoints based upon engine operating conditions. During transient engine operation (i.e. dynamic or time varying) the response time of individual engine systems must be taken into account in specifying performance setpoints. Individual diesel engine systems, such as EGR (Exhaust Gas Recirculation), fuel, air, DPF (Diesel Particulate Filter) DOC (Diesel Oxidation Catalyst) and SCR (Selective Catalytic Reduction) have very different dynamic response times. While fuel injectors response time (i.e. injection rate and timing) is of the order of milliseconds, the injection system rail pressure system response is of the order of half a second, the air and EGR systems respond tens of times slower than the rail pressure control system and after treatment systems, due to their remote locations respond hundred of times slower that the injection equipment. During transient operation of the engine, it is difficult to control engine emissions. There is a continuing need in the industry for a method to compensate engine setpoints during transient operation based upon a modeled system response to improve transient engine emissions to meet stringent Federal emissions guidelines and requirements.

SUMMARY OF THE INVENTION

Figure 1:
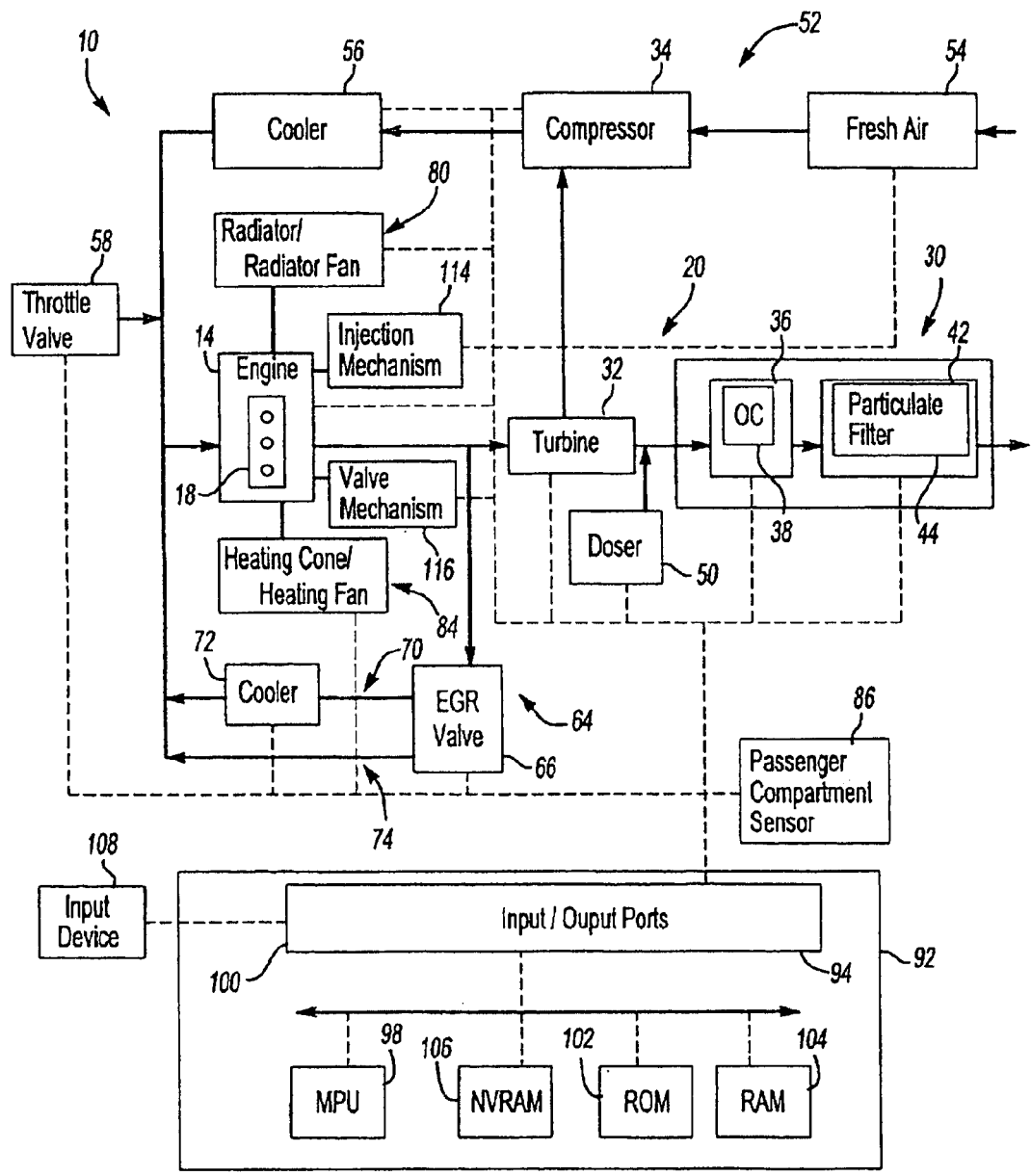
FIG. 1 is a schematic view of an engine system in accordance the present invention.

The present invention is directed in one embodiment to a method to improve transient emission control in an electronically controlled heavy duty diesel engine equipped with a fuel system and an air system having an EGR circuit, and a memory within an Engine Control Module (ECM). The method comprises determining a required transient air fuel ratio; determining a change in air fuel ratio($\Delta AFR$);determining a change in EGR setpoint ($\Delta EGR$) to compensate for air system response; determining a transient EGR setpoint; determining a final EGR setpoint; determining a required transient fuel system pressure setpoint; determining a change in fuel system pressure comparing; determining a change in beginning of injection ($\Delta BOI$); determining a transient beginning of injection setpoint; determining a final beginning of injection setpoint; implementing the final EGR setpoint to compensate for the air system reaction time during transient engine operation and implementing the final BOI to compensate for the fuel system reaction times during transient engine operation to improve engine operation and reduce emissions.

The present invention further relates to a method to improve transient emission control in an electronically controlled heavy duty diesel engine equipped with a common rail fuel system and an air system having an EGR, and a memory within a Engine Control Module (ECM), comprising, estimating a required transient air-fuel ratio setpoint from an air-fuel ratio setpoint model using engine emission targets and fuel economy targets; comparing said required transient air-fuel ratio setpoint with an actual air fuel ratio to compute a difference between the required transient air fuel ratio and the actual air fuel ratio as $\Delta$ Air Fuel Ratio ($\Delta AFR$); calculating a partial derivative of at least one target engine emission with respect to air fuel ratio ($\Delta$ target emission/$\Delta AFR$); calculating a partial derivative of at least one target engine emission with respect to EGR ($\Delta$ target emission/$\Delta$ EGR); multiplying $\Delta AFR$ by the rate of change of target emission with respect to AFR ($\Delta$ target emission/$\Delta$ AFR) and dividing said sum by the rate of change of the target emission with respect to EGR($\Delta$ target emission/$\Delta$ EGR) to calculate the change in EGR ($\Delta EGR$) setpoint necessary to compensate for the air response; estimating a transient EGR setpoint from an EGR setpoint model using engine emission targets and fuel economy targets; calculating a final EGR setpoint by adding the $\Delta EGR$ and the transient EGR setpoint; estimating a required transient common rail pressure setpoint from a common rail pressure setpoint model using engine emission targets and fuel economy targets; comparing said transient common rail pressure with an actual common rail pressure and computing a difference between the transient common rail pressure and the actual common rail pressure as $\Delta P_{rail}$; calculating a partial derivative of at least one target engine emission with respect to common rail pressure ($\Delta$ target emission/$\Delta P_{rail}$); calculating a partial derivative of at least one target engine emission with respect to beginning of injection ($\Delta$ target engine emission/$\Delta$ BOI); multiplying the $\Delta P_{rail}$ by the rate of change of target emission with respect to rail pressure ($\Delta$ target emission/$\Delta P_{rail}$) and dividing said sum by the rate of change of target emission with respect to BOI ($\Delta$target emission/$\Delta$ BOI) to calculate the change in beginning of injection ($\Delta BOI$); estimating a transient beginning of injection setpoint from a beginning of injection setpoint model using engine emission targets and fuel economy targets; calculating a final beginning of injection setpoint (Final BOI) by adding the $\Delta BOI$ and the transient beginning of injection setpoint; implementing the final EGR setpoint to compensate for the air system reaction time during transient engine operation and implementing the final BOI to compensate for the fuel system reaction times during transient engine operation to improve engine operation and reduce emissions.

DETAILED DESCRIPTION OF A PREFERRED EMBODIMENT(S)

FIG. 1 illustrates a vehicle powertrain system 10 in accordance with one non-limiting aspect of the present invention. The system 10 may provide power for driving any number of vehicles, including on-highway trucks, construction equipment, marine vessels, stationary generators, automobiles, trucks, tractor-trailers, boats, recreational vehicle, light and heavy-duty work vehicles, and the like.

The system 10 may be referred to as an internal combustion driven system wherein fuels, such as gasoline and diesel fuels, are burned in a combustion process to provide power, such as with a compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally, the system 20 may include a turbocharger proximate the exhaust manifold for compressing fresh air delivery into the engine 14. The turbocharger, for example, may include a turbine 32 and a compressor 34, such as a variable geometry turbocharger (VGT) and/or a turbocompound power turbine. Of course, the present invention is not limited to exhaust systems having turbochargers or the like.

The particulate filter assembly 30 may be configured to capture particulates associated with the combustion process. In more detail, the particulate filter assembly 30 may include an oxidation catalyst (OC) canister 36, which in includes an OC 38, and a particulate filter canister 42, which includes a particulate filter 44. The canisters 36, 42 may be separate components joined together with a clamp or other feature such that the canisters 36, 42 may be separated for servicing and other operations. Of course, the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the OC canister 36 or substrate 38 and that the particulate filter 44 may be located in other portions of the exhaust system 20, such as upstream of the turbine 32.

The OC 38, which for diesel engines is commonly referred to as a diesel oxidation catalyst, may oxidize hydrocarbons and carbon monoxide included within the exhaust gases so as to increase temperatures at the particulate filter 44. The particulate filter 44 may capture particulates included within the exhaust gases, such as carbon, oil particles, ash, and the like, and regenerate the captured particulates if temperatures associated therewith are sufficiently high. In accordance with one non-limiting aspect of the present invention, one object of the particulate filter assembly 30 is to capture harmful carbonaceous particles included in the exhaust gases and to store these contaminates until temperatures at the particulate filter 44 favor oxidation of the captured particulates into a gas that can be discharged to the atmosphere.

The OC and particulate filter canisters 36, 42 may include inlets and outlets having defined cross-sectional areas with expansive portions therebetween to store the OC 38 and particulate filter 44, respectively. However, the present invention contemplates that the canisters 36, 42 and devices therein may include any number configurations and arrangements for oxidizing emissions and capturing particulates. As such, the present invention is not intended to be limited to any particular configuration for the particulate filter assembly 30.

To facilitate oxidizing the capture particulates, a doser 50 may be included to introduce fuel to the exhaust gases such that the fuel reacts with the OC 38 and combusts to increase temperatures at the particulate filter 44, such as to facilitate regeneration. For example, one non-limiting aspect of the present invention contemplates controlling the amount of fuel injected from the doser as a function of temperatures at the particulate filter 44 and other system parameters, such as air mass flow, EGR temperatures, and the like, so as to control regeneration. However, the present invention also contemplates that fuel may be included within the exhaust gases through other measures, such as by controlling the engine 14 to emit fuel with the exhaust gases.

An air intake system 52 may be included for delivering fresh air from a fresh air inlet 54 through an air passage to an intake manifold for introduction to the engine 14. In addition, the system 52 may include an air cooler or charge air cooler 56 to cool the fresh air after it is compressed by the compressor 34. Optionally, a throttle intake valve 58 may be provided to control the flow of fresh air to the engine 14. The throttle valve 58 may be an electrically operated valve. There are many variations possible for such an air intake system and the present invention is not intended to be limited to any particular arrangement. Rather, the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The EGR system 64 may selectively introduce a metered portion of the exhaust gasses into the engine 14. The EGR system 64, for example, may dilute the incoming fuel charge and lower peak combustion temperatures to reduce the amount of oxides of nitrogen produced during combustion. The amount of exhaust gas to be recirculated may be controlled by controlling an EGR valve 66 and/or in combination with other features, such as the turbocharger. The EGR valve 66 may be a variable flow valve that is electronically controlled. There are many possible configurations for the controllable EGR valve 66 and embodiments of the present invention are not limited to any particular structure for the EGR valve 66.

The EGR system 64 in one non-limiting aspect of the present invention may include an EGR cooler passage 70, which includes an air cooler 72, and an EGR non-cooler bypass 74. The EGR value 66 may be provided at the exhaust manifold to meter exhaust gas through one or both of the EGR cooler passage 70 and bypass 74. Of course, the present invention contemplates that the EGR system 64 may include more or less of these features and other features for recycling exhaust gas. Accordingly, the present invention is not intended to be limited to any one EGR system and contemplates the use of other such systems, including more or less of these features, such as an EGR system having only one of the EGR cooler passage or bypass.

A cooling system 80 may be included for cycling the engine 14 by cycling coolant therethrough. The coolant may be sufficient for fluidly conducting away heat generated by the engine 14, such as through a radiator. The radiator may include a number of fins through which the coolant flows to be cooled by air flow through an engine housing and/or generated by a radiator fan directed thereto as one skilled in the art will appreciated. It is contemplated, however, that the present invention may include more or less of these features in the cooling system 80 and the present invention is not intended to be limited to the exemplary cooling system described above.

The cooling system 80 invention may operate in conjunction with a heating system 84. The heating system 84 may include a heating cone, a heating fan, and a heater valve. The heating cone may receive heated coolant fluid from the engine 14 through the heater valve so that the heating fan, which may be electrically controllable by occupants in a passenger area or cab of a vehicle, may blow air warmed by the heating cone to the passengers. For example, the heating fan may be controllable at various speeds to control an amount of warmed air blown past the heating cone whereby the warmed air may then be distributed through a venting system to the occupants. Optionally, sensors and switches 86 may be included in the passenger area to control the heating demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module, may be included in the system 10 to control various operations of the engine 14 and other system or subsystems associated therewith, such as the sensors in the exhaust, EGR, and intake systems. Various sensors may be in electrical communication with the controller via input/output ports 94. The controller 92 may include a microprocessor unit (MPU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information therebetween. The device 108 may be used to change values within the computer readable storage media, such as configuration settings, calibration variables, instructions for EGR, intake, and exhaust systems control and others.

The system 10 may include an injection mechanism 114 for controlling fuel and/or air injection for the cylinders 18. The injection mechanism 114 may be controlled by the controller 92 or other controller and comprise any number of features, including features for injecting fuel and/or air into a common-rail cylinder intake and a unit that injects fuel and/or air into each cylinder individually. For example, the injection mechanism 114 may separately and independently control the fuel and/or air injected into each cylinder such that each cylinder may be separately and independently controlled to receive varying amounts of fuel and/or air or no fuel and/or air at all. Of course, the present invention contemplates that the injection mechanism 114 may include more or less of these features and is not intended to be limited to the features described above.

The system 10 may include a valve mechanism 116 for controlling valve timing of the cylinders 18, such as to control air flow into and exhaust flow out of the cylinders 18. The valve mechanism 116 may be controlled by the controller 92 or other controller and comprise any number of features, including features for selectively and independently opening and closing cylinder intake and/or exhaust valves. For example, the valve mechanism 116 may independently control the exhaust valve timing of each cylinder such that the exhaust and/or intake valves may be independently opened and closed at controllable intervals, such as with a compression brake. Of course, the present invention contemplates that the valve mechanism may include more or less of these features and is not intended to be limited to any of the features described above.

In operation, the controller 92 receives signals from various engine/vehicle sensors and executes control logic embedded in hardware and/or software to control the system 10. The computer readable storage media may, for example, include instructions stored thereon that are executable by the controller 92 to perform methods of controlling all features and sub-systems in the system 10. The program instructions may be executed by the controller in the MPU 98 to control the various systems and subsystems of the engine and/or vehicle through the input/output ports 94. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof.

In one non-limiting aspect of the present invention, the controller 92 may be the DDEC controller available from Detroit Diesel Corporation, Detroit, Mich. Various other features of this controller are described in detail in a number of U.S. patents assigned to Detroit Diesel Corporation. Further, the controller may include any of a number of programming and processing techniques or strategies to control any feature in the system 10. Moreover, the present invention contemplates that the system may include more than one controller, such as separate controllers for controlling system or sub-systems, including an exhaust system controller to control exhaust gas temperatures, mass flow rates, and other features associated therewith. In addition, these controllers may include other controllers besides the DDEC controller described above.

Figure 2:
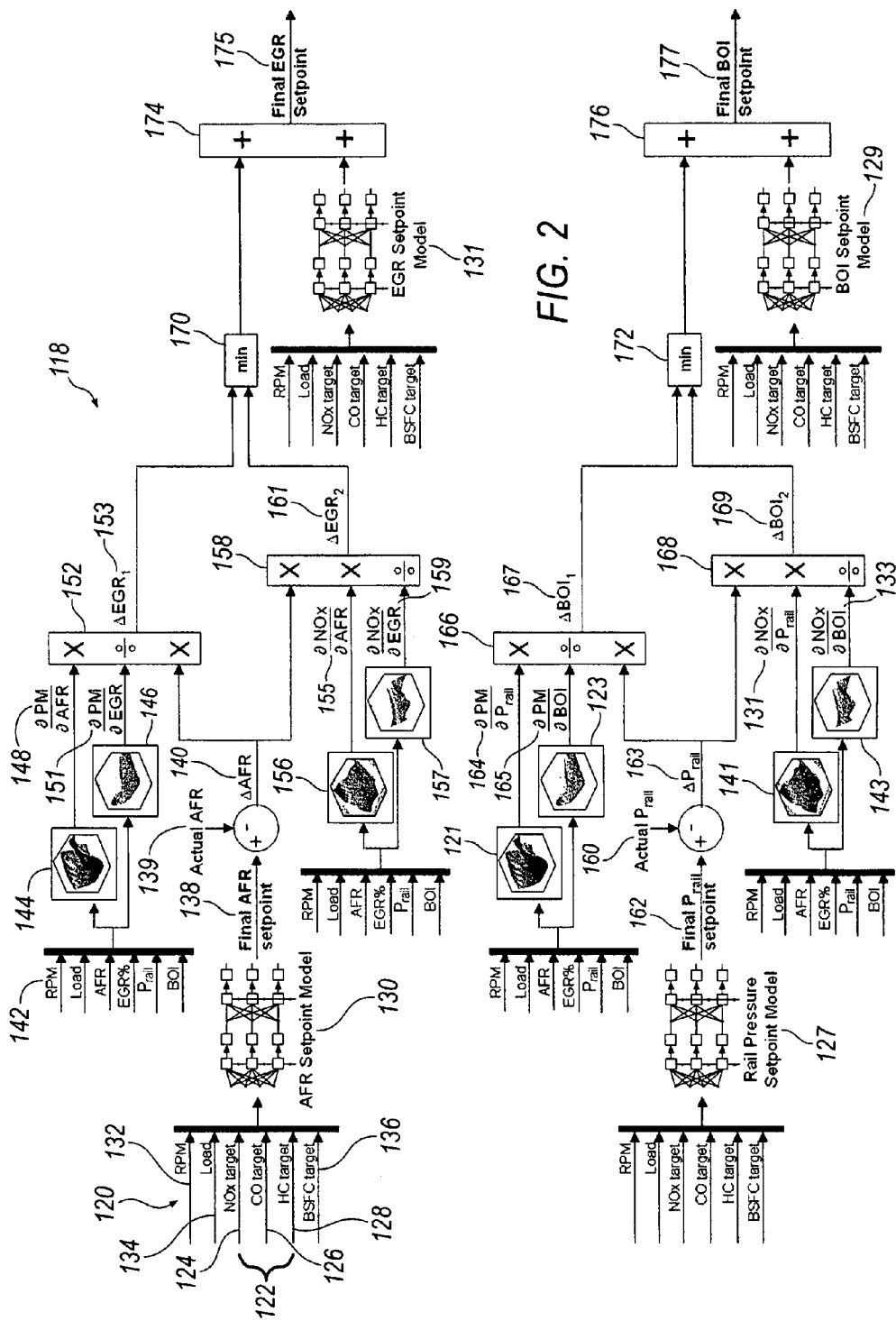
FIG. 2 is an illustration of a flow chart showing the method for improving transient emission control in an electronically controlled heavy duty diesel engine.

Turning now to FIG. 2, there is shown therein an illustration of a flow chart showing the method for improving transient emission control in an electronically controlled heavy duty diesel engine.

Specifically, in method 118 various engine targets 120 are used in the method of the present invention. Engine emission targets 122 such as NOx target, 124 CO target 126, and Hydrocarbon (HC) target 128 are calculated by the MPU or are stored in tables within the MPU. Similarly, various engine operation targets such as engine RPM target 132, engine Load target 134, and Brake Specific Fuel Consumption (BSFC) target 136 are calculated or stored within tables in the MPU. An Air Fuel Ratio (AFR) Setpoint Model 130 is used to determine possible AFR setpoints to be incurred during operation of the engine. Similarly, using the same engine emission targets, an EGR setpoint model 131 is created as well as a Beginning of Injection (BOI) setpoint model 129 is created and a Fuel Delivery Pressure setpoint model 127(depicted as a Rail Pressure Setpoint Model). These may be stored within a table in the MPU or contained within a neural net within the MPU.

Using engine emission targets and engine operation targets and the AFR setpoint model, a final AFR setpoint 138 is determined. The actual AFR 139 is then subtracted from the final AFR setpoint to determine the change in AFR ($\Delta$AFR) 140. Simultaneously, various engine targets 142 such as RPM, Engine Load, AFR, EGR rate, fuel pressure delivery, (represented in the illustrated case as common rail pressure) and fuel timing (represented as beginning of injection (BOI)) are input to neural nets 144 and 146, (it should be noted that these targets could also be input to tables within the MPU) whereby it is possible to determine the rate of change of Particulate Matter (PM) with respect to air fuel ratio (AFR) in the exhaust during transient engine operation. The resulting partial derivative $\Delta$PM/$\Delta$AFR at 148 is one input to determine the change in EGR ($\Delta$EGR). Similarly, at 151, $\Delta$PM/$\Delta$EGR is looked-up in a set of tables or calculated by a neural net model. At step 152, $\Delta$AFR is multiplied by $\Delta$PM/$\Delta$ AFR and that product is divided by $\Delta$PM/$\Delta$ AFR to calculate a first change in EGR ($\Delta$EGR$_1$) 153. $\Delta$EGR$_1$ 153 represents the required change in EGR to compensate for the effect of $\Delta$AFR on Particulate Matter (PM).

Simultaneously with the determination set forth in the preceding paragraph, the same engine inputs are, through the neural net 156 and 157 used to determine the partial derivative of NOx with respect to AFR ($\Delta$ NOX/$\Delta$AFR) 155 and the partial derivative of NOx with respect to EGR (159). At step 158, $\Delta$AFR is multiplied by $\Delta$NOx/$\Delta$AFR and that product is divided by $\Delta$NOx/$\Delta$EGR to calculate a second change in EGR ($\Delta$EGR$_2$) 161. $\Delta$EGR$_2$ 161 represents the required change in EGR to compensate for the effect of $\Delta$EGR$_2$ on NOx.

Concurrently with the determination of the Final AFR, the same engine output targets are used in a fuel delivery pressure setpoint model within the MPU to determine the final fuel delivery setpoint 162. The Actual fuel delivery pressure 160 is then subtracted from the final fuel delivery setpoint to determine the difference in fuel delivery pressure ($\Delta$ FDP) 163.

Simultaneously, with the steps in the preceding paragraphs, the same engine outputs are used to calculate the partial derivative of NOx and PM with respect to FDP and BOI. At step 164 the rate of change of PM with respect to FDP is calculated and at 165 the rate of change of PM with respect to BOI is calculated. At step 166 the $\Delta$FDP is multiplied by the $\Delta$PM/$\Delta$ FDP and that product is then divided at 166 by $\Delta$PM/$\Delta$ BOI to determine a change in the first BOI ($\Delta$BOI$_1$) as seen at step 167. $\Delta$BOI$_1$ represents the required change in BOI to compensate for the effect of $\Delta$FDP on PM. At the same time, the rate of change of NOx with respect to FDP is calculated at 131 as ($\Delta$NOx/$\Delta$FDP), and the rate of NOx with respect to BOI is calculated in 133. At step 168 the $\Delta$FDP is multiplied by the quotient $\Delta$NOx/$\Delta$FDP and the resulting product is divided by the quotient $\Delta$NOx/$\Delta$BOI to determine the change in a second BOI ($\Delta$BOI$_2$) at step 169. $\Delta$BOI$_2$ represents the required change in BOI to compensate for the effect of $\Delta$FDP on NOx.

At step 170, $\Delta$EGR1 and $\Delta$EGR2 are compared and the smaller value of the two is fed to summation 174. Simultaneously, at step 172, $\Delta$BOI$_1$ and $\Delta$BOI$_2$ are compared and the smaller value of the two is fed to summation 176.

At summation 174, the minimum $\Delta$EGR and inputs from the EGR setpoint model are added together to determine the final EGR setpoint 175. Concurrently at step 176 the minimum $\Delta$BOI and inputs from the BOI setpoint model are added together to determine the final BOI setpoint 177. These final setpoints are used during transient engine operation in order to compensate for the various response times of the several systems previously described and permit the engine to operate within federal emission standards.

While embodiments of the invention have been illustrated and described, it is not intended that these embodiments illustrate and describe all possible forms of the invention. The words used in the specification and claims are words of description, not words of limitation. Those skilled in the art will understand that many variations are possible without departing form the scope and spirit of the invention.

The invention claimed is:

1. A method to improve transient emission control in an electronically controlled heavy duty diesel engine equipped with a fuel system and an air system having an EGR, and a memory within an Engine Control Module (ECM) comprising:

determining a required transient air fuel ratio;
   determining a difference in air fuel ratio (setpoint minus actual), $\Box$AFR;
   determining a change in EGR setpoint ($\Delta$EGR) to compensate for air system response;
   determining a transient EGR setpoint;
   determining a final EGR setpoint;
   determining a required transient fuel system pressure setpoint;
   determining a difference in fuel system pressure (setpoint minus actual), $\Box$FDP;
   determining a change in beginning of injection ($\Delta$BOI);
   determining a transient beginning of injection setpoint;
   determining a final beginning of injection setpoint;
   implementing the final EGR setpoint to compensate for the air system reaction time during transient engine operation and implementing the final BOI to compensate for the fuel system reaction times during transient engine operation to improve engine operation and reduce emissions.

2. The method of claim 1, wherein determining said transient air fuel ratio setpoint is made using an air fuel ratio setpoint model derived from engine emission targets and fuel economy targets stored within memory.

3. The method of claim 1, wherein determining said required air fuel ratio setpoint I made by comparing the required transient air fuel ratio setpoint with an actual air fuel ratio setpoint to compute the difference between the required transient air fuel ratio and the actual air fuel ratio $\Delta$ Air Fuel Ratio ($\Delta$AFR).

4. The method of claim 1, wherein multiplying $\Delta$AFR by $\Delta$target engine emission/$\Delta$ AFR and dividing said sum by $\Delta$target engine emission/$\Delta$ EGR to calculate the change in EGR ($\Delta$EGR) setpoint necessary to compensate for the air system response.

5. The method of claim 1, wherein determining said transient EGR setpoint is made from an EGR setpoint model using engine emission targets and fuel economy targets.

6. The method of claim 1, wherein determining said final EGR setpoint is made by adding the $\Delta$EGR and the transient EGR setpoint.

7. The method of claim 1, wherein determining the transient fuel system pressure setpoint is made by a fuel system pressure setpoint model using engine emission targets and fuel economy targets.

8. The method of claim 1, wherein determining said $\Delta$BOI is made by calculating a partial derivative of at least one target engine emission with respect to common rail pressure ($\Delta$target emission/$\Delta$ fuel system delivery pressure ($\Delta$FDP)); calculating a partial derivative of at least one target engine emission with respect to beginning of injection ($\Delta$target engine emission/Δ BOI); and multiplying the $\Delta P_{rail}$ by Δtarget emission/Δ FDP and dividing said sum by Δtarget emission/Δ BOI to calculate a required change in beginning of injection (ΔBOI).

9. The method of claim 1, wherein determining said transient beginning of injection setpoint is made from a model using engine emission targets and fuel economy targets.

10. A method to improve transient emission control in an electronically controlled heavy duty diesel engine equipped with a common rail fuel system and an air system having an EGR system, and a memory within an Engine Control Module (ECM), comprising:

estimating a required transient air-fuel ratio setpoint from an air-fuel ratio setpoint model using engine emission targets and fuel economy targets;

comparing said required transient air-fuel ratio setpoint with an actual air fuel ratio to compute a difference between the required transient air fuel ratio and the actual air fuel ratio as Δ Air Fuel Ratio (ΔAFR);

calculating a partial derivative of at least on target engine emission with respect to Air Fuel Ratio (Δtarget engine emission/Δ AFR);

calculating a partial derivative of at least one target engine emission with respect to EGR (Δtarget engine emission/Δ EGR);

multiplying ΔAFR by Δtarget engine emission/Δ AFR and dividing said product by Δtarget engine emission/Δ EGR to calculate the change in EGR (ΔEGR) setpoint necessary to compensate for the air system response;

estimating a transient EGR setpoint from an EGR setpoint model using engine emission targets and fuel economy targets;

calculating a final EGR setpoint by adding the ΔEGR and the transient EGR setpoint;

estimating a required transient common rail pressure setpoint from a common rail pressure setpoint model using engine emission targets and fuel economy targets;

comparing said transient common rail pressure with an actual common rail pressure and computing a difference between the transient common rail pressure and the actual common rail pressure as $\Delta P_{rail}$;

calculating a partial derivative of at least one target engine emission with respect to common rail pressure (Δtarget emission/Δ $P_{rail}$);

calculating a partial derivative of at least one target engine emission with respect to beginning of injection (Δtarget engine emission/Δ BOI);

multiplying the ΔP rail by Δtarget emission/$\Delta P_{rail}$ and dividing said product by Δtarget emission/Δ BOI to calculate the change in beginning of injection (ΔBOI);

estimating a transient beginning of injection setpoint from a beginning of injection setpoint model using engine emission targets and fuel economy targets;

calculating a final beginning of injection setpoint (Final BOI) by adding the ΔBOI and the transient beginning of injection setpoint;

implementing the final EGR setpoint to compensate for the air system reaction time during transient engine operation and implementing the final BOI to compensate for the fuel system reaction times during transient engine operation to improve engine operation and reduce emissions.

11. The method of claim 10, wherein said engine emission targets are NOx, HC, BSFC and CO targets.

12. The method of claim 10, wherein said engine measured operating conditions are engine RPM and engine Load.

13. The method of claim 10, wherein said Air Fuel Ratio Setpoint model is neural network based.

14. The method of claim 10, wherein said Air Fuel Ratio Setpoint is table based within the memory of the ECM.

15. The method of claim 10, wherein said Pressure rail setpoint model is neural network based.

16. The method of claim 10, wherein said Pressure Rail Setpoint Model is table based within the memory of the ECM.

17. The method of claim 10, wherein said EGR setpoint Model is neural network based.

18. The method of claim 10, wherein said EGR Setpoint Model is table based within the memory of the ECM.

19. The method of claim 10, wherein said beginning of injection setpoint model is neural network based.

20. The method of claim 11, wherein said beginning of injection setpoint model is table based within the memory of the ECM.

* * * * *